US008817728B2

(12) United States Patent
Malladi et al.

(10) Patent No.: US 8,817,728 B2
(45) Date of Patent: Aug. 26, 2014

(54) SYSTEM AND METHOD FOR THIRD-PARTY ASSISTED PEER-TO-PEER COMMUNICATION

(75) Inventors: Durga Prasad Malladi, San Diego, CA (US); Tao Luo, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 13/401,818

(22) Filed: Feb. 21, 2012

(65) Prior Publication Data

US 2012/0213173 A1 Aug. 23, 2012

Related U.S. Application Data

(60) Provisional application No. 61/445,405, filed on Feb. 22, 2011.

(51) Int. Cl.
*H04W 72/04* (2009.01)

(52) U.S. Cl.
USPC ........... 370/329; 370/315; 370/328; 370/312; 455/403; 455/561; 455/500

(58) Field of Classification Search
USPC ........................................................ 370/329
See application file for complete search history.

(56) References Cited

U.S. PATENT DOCUMENTS

| | | | | |
|---|---|---|---|---|
| 7,349,696 | B2 * | 3/2008 | Pedlar et al. | 455/434 |
| 8,284,680 | B2 * | 10/2012 | Lee et al. | 370/242 |
| 8,406,771 | B2 * | 3/2013 | Kunugi et al. | 455/440 |
| 8,428,547 | B2 * | 4/2013 | Jung | 455/403 |
| 2007/0184826 | A1 * | 8/2007 | Park et al. | 455/422.1 |
| 2009/0323580 | A1 * | 12/2009 | Xue et al. | 370/315 |
| 2010/0173659 | A1 * | 7/2010 | Shin et al. | 455/500 |
| 2010/0226243 | A1 | 9/2010 | Lee et al. | |
| 2010/0302996 | A1 * | 12/2010 | Matsumoto et al. | 370/315 |
| 2011/0096722 | A1 | 4/2011 | Jung | |

(Continued)

FOREIGN PATENT DOCUMENTS

| | | | |
|---|---|---|---|
| EP | 2280496 | A1 | 2/2011 |
| WO | 2010019340 | A1 | 2/2010 |

OTHER PUBLICATIONS

Katti, S. et al., XORs in The Air: Practical Wireless Network Coding, SIGCOMM'06, Sep. 2006, pp. 243-254.

(Continued)

*Primary Examiner* — Ian N Moore
*Assistant Examiner* — Lakeram Jangbahadur
(74) *Attorney, Agent, or Firm* — Novak Druce Connolly Bove + Quigg LLP

(57) ABSTRACT

Techniques are provided for third-party assisted peer-to-peer (P2P) communication. For example, there is provided a method, operable by a network entity, that may involve receiving first information from a first mobile entity, the first information comprising a first message for a second mobile entity. The method may involve receiving second information from the second mobile entity, the second information comprising a second message for the first mobile entity. The method may further involve coding third information based at least in part on the first information and the second information, and sending the third information to the first and second mobile entities. The method may also involve transmitting a control signal that includes processing information for decoding the coded third information to extract the first message or the second message.

26 Claims, 10 Drawing Sheets

(56) References Cited

U.S. PATENT DOCUMENTS

| | | | | |
|---|---|---|---|---|
| 2011/0176474 | A1* | 7/2011 | Saito et al. | 370/315 |
| 2011/0235743 | A1* | 9/2011 | Lee et al. | 375/295 |
| 2011/0261771 | A1* | 10/2011 | Nagata et al. | 370/329 |
| 2011/0268012 | A1* | 11/2011 | Jo et al. | 370/312 |
| 2012/0149392 | A1* | 6/2012 | Siomina et al. | 455/456.1 |

OTHER PUBLICATIONS

International Search Report and Written Opinion—PCT/US2012/026084—ISA/EPO—May 30, 2012.

* cited by examiner

SYSTEM AND METHOD FOR THIRD-PARTY ASSISTED PEER-TO-PEER COMMUNICATION

CROSS-REFERENCE TO RELATED APPLICATION

The present Application for Patent claims priority to Provisional Application No. 61/445,405, filed Feb. 22, 2011, entitled "SYSTEM AND METHOD FOR THIRD-PARTY ASSISTED PEER-TO-PEER COMMUNICATION", and is assigned to the assignee hereof, and is hereby expressly incorporated in its entirety by reference herein.

BACKGROUND

1. Field

The present application relates generally to wireless communications, and more specifically to network coding for peer-to-peer communication of wireless devices.

2. Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). The LTE physical layer (PHY) is a highly efficient means of conveying both data and control information between an evolved NodeB (eNB) and mobile entities, such as, for example, access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single-Carrier Frequency Division Multiple Access (SC-FDMA) on the uplink (UL). OFDMA allows data to be directed to or from multiple users on a subcarrier-by-subcarrier basis for a specified number of symbol periods.

Examples of older wireless communication systems widely deployed to provide various types of communication content such as voice and data include Code Division Multiple Access (CDMA) systems, including CDMA2000, Wideband CDMA, Global System for Mobile communications (GSM), and Universal Mobile Telecommunication System (UMTS). These wireless communication systems and LTE systems generally use different radio access technologies (RATs) and communication protocols, operate at different frequency bands, provide different quality of service (QoS), and offer different types of services and applications to the system users.

In a direct wireless connection, a first mobile entity transmits a wireless signal directly to a second mobile entity, which receives and processes the wireless signal. Examples of direct wireless connections include connections from a mobile entity to eNB(s) in LTE or other wireless communications protocols, or peer-to-peer (P2P) connections between mobile entities as used in non-cellular protocols such as WiFi Direct or Bluetooth. Cellular wireless communications systems do not typically include direct connections between mobile entities. Rather, the mobile entities typically communicate indirectly with one another through one or more NodeBs and associated network infrastructure. In this context, there is a need for efficiently implementing network coding to manage third-party assisted P2P communications.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a method for third-party assisted peer-to-peer (P2P) communication by a third-party entity (e.g., a network entity, such as an evolved NodeB (eNB) or the like). The method may involve receiving first information from a first mobile entity, the first information comprising a first message for a second mobile entity. The method may also involve receiving second information from the second mobile entity, the second information comprising a second message for the first mobile entity. The method may further involve coding third information based at least in part on the first information and the second information, and sending the third information to the first and second mobile entities. The method may also involve transmitting a control signal that includes processing information for decoding the coded third information to extract the first message or the second message. In related aspects, an electronic device (e.g., an eNB or component(s) thereof) may be configured to execute the above-described methodology. In further related aspects, third-party entity may be a third mobile entity, instead of a network entity.

In accordance with one or more aspects of the embodiments described herein, a method is provided for third-party assisted P2P communication by a mobile entity (e.g., a user equipment (UE) or the like). The method may involve sending first information to a third-party entity, the first information comprising a first message for a peer mobile entity in operative communication with the third-party entity. The method may also involve receiving coded information from the third-party entity, the code information comprising a message portion. The method may further involve receiving control signaling from the third-party entity, the control signaling including processing information for decoding the coded information. The method may also involve extracting a second message from the message portion of the coded information based at least in part on the first information and the processing information. In related aspects, an electronic device (e.g., a UE or component(s) thereof) may be configured to execute the above-described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DESCRIPTION

Figure 1:
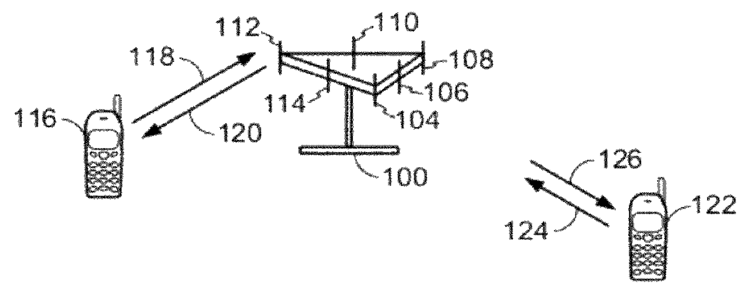
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. In the following description, for reasons of conciseness and clarity, terminology associated with W-CDMA and LTE standards, as promulgated under the 3GPP standards by the International Telecommunication Union (ITU), is used. It should be emphasized that the techniques described herein are applicable to other technologies, such as the technologies and standards mentioned above.

Single-Carrier Frequency Division Multiple Access (SC-FDMA), which utilizes single carrier modulation and frequency domain equalization, has similar performance and essentially the same overall complexity as those of OFDMA systems. An SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is used for uplink multiple access in 3GPP LTE, or Evolved UTRA.

Referring to FIG. 1, a multiple access wireless communication system according to one embodiment is illustrated. An access point 100 (e.g., base station, evolved NodeB (eNB), or the like) includes multiple antenna groups, one including 104 and 106, another including 108 and 110, and an additional one including 112 and 114. In FIG. 1, two antennas are shown for each antenna group, however, more or fewer antennas may be utilized for each antenna group. A mobile entity 116 is in communication with the antennas 112 and 114, where the antennas 112 and 114 transmit information to the mobile entity 116 over a forward link 120 and receive information from the mobile entity 116 over a reverse link 118. A mobile entity 122 is in communication with the antennas 104 and 106, where the antennas 104 and 106 transmit information to the mobile entity 122 over a forward link 126 and receive information from the mobile entity 122 over a reverse link 124. In a Frequency Division Duplex (FDD) system, the communication links 118, 120, 124 and 126 may use different frequencies for communication. For example, the forward link 120 may use a different frequency than that used by the reverse link 118.

Each group of antennas and/or the area in which they are designed to communicate is often referred to as a sector of the access point. In certain embodiments, antenna groups each are designed to communicate with mobile entities in a sector, of the areas covered by the access point 100.

In communication over the forward links 120 and 126, the transmitting antennas of the access point 100 may utilize beamforming in order to improve the signal-to-noise ratio of forward links for the different mobile entities 116 and 122. Also, an access point using beamforming to transmit to mobile entities scattered randomly through its coverage causes less interference to mobile entities in neighboring cells than an access point transmitting through a single antenna to all its mobile entities.

An access point may be a fixed station used for communicating with the terminals and may also be referred to as an access point, a NodeB, an eNB, or some other terminology. A mobile entity may also be referred to as an access terminal (AT), a user equipment (UE), a mobile station, a wireless communication device, terminal, or the like.

Figure 2:
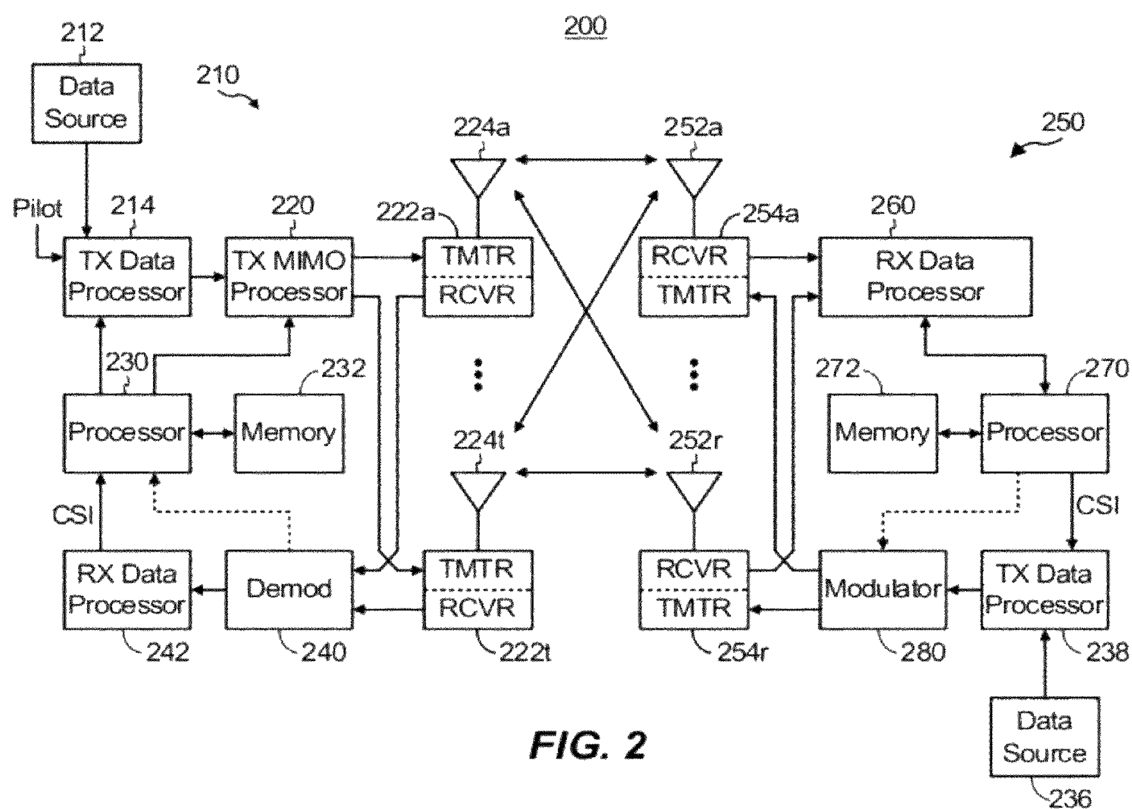
FIG. 2 illustrates a block diagram of a communication system.

FIG. 2 is a block diagram of an embodiment of a transmitter system 210 (also known as an access point) and a receiver system 250 (also known as a mobile entity) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped)

based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222*a* through 222*t*. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222*a* through 222*t* are then transmitted from $N_T$ antennas 224*a* through 224*t*, respectively.

At the receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use. The processor 270 formulates a reverse link message comprising a matrix index portion and a rank value portion, and may be in operative communication with a memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transmitters 254*a* through 254*r*, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
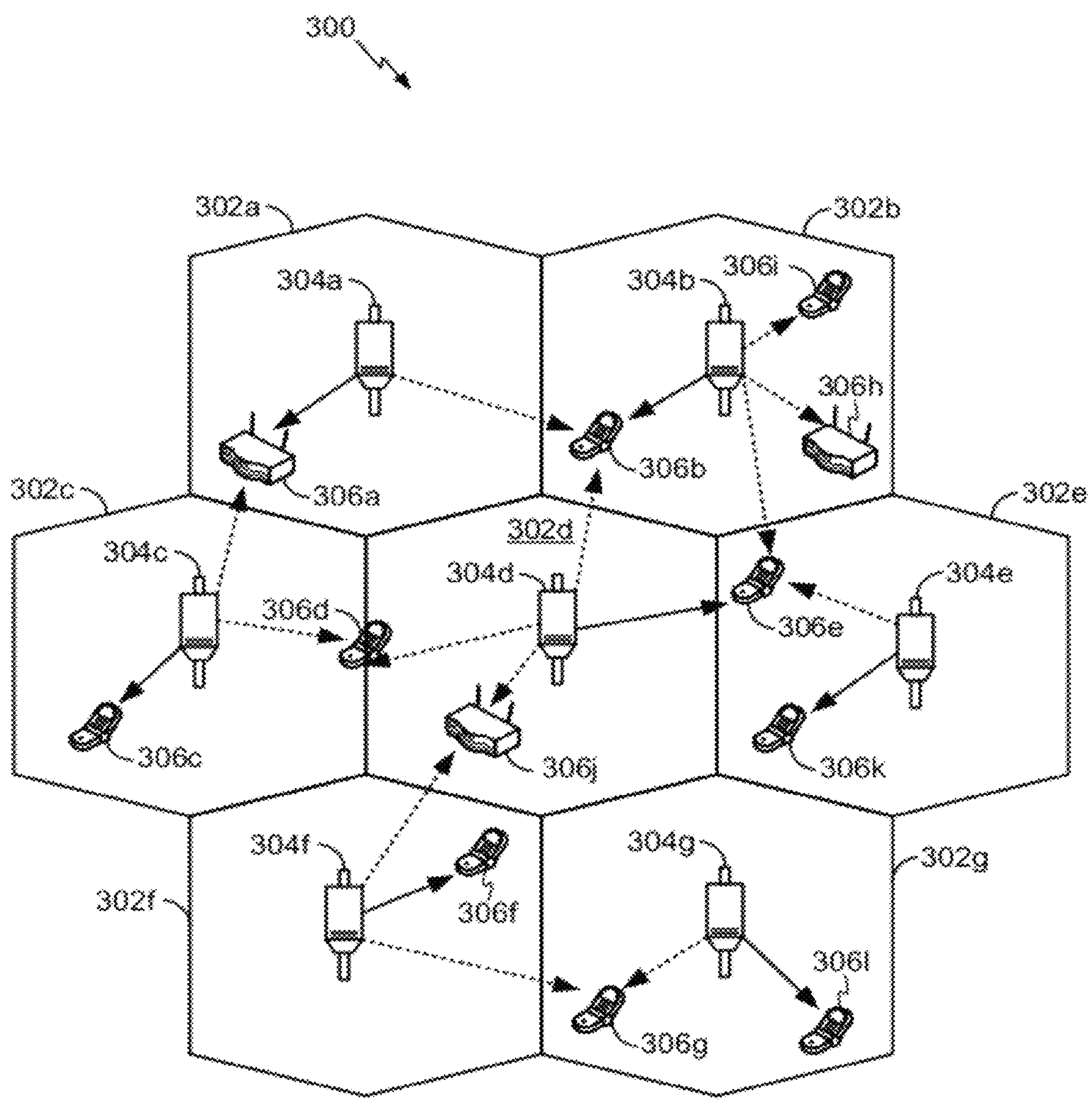
FIG. 3 illustrates a wireless communication system configured to support a number of users.

FIG. 3 illustrates a wireless communication system 300, configured to support a number of users, in which the teachings herein may be implemented. The system 300 provides communication for multiple cells 302, such as, for example, macro cells 302*a*-302*g*, with each cell being serviced by a corresponding access node 304 (e.g., access nodes 304*a*-304*g*). As shown in FIG. 3, mobile entities 306 (e.g., mobile entities 306*a*-306*l*) may be dispersed at various locations throughout the system over time. Each mobile entity 306 may communicate with one or more access nodes 304 on a forward link ("FL") and/or a reverse link ("RL) at a given moment, depending upon whether the mobile entity 306 is active and whether it is in soft handoff (if applicable), for example. The wireless communication system 300 may provide service over a large geographic region. For example, macro cells 302*a*-302*g* may cover a few blocks in an urban or suburban neighborhood or a few square miles in a rural environment.

In accordance with aspects of the subject of this disclosure, there is provided a wireless network (e.g., a 3GPP network) having a feature for using a spectrum provider (e.g., an LTE network provider) for peer-to-peer (P2P) communication. In this context, P2P communication is a direct communication between two mobile entities without the need for transportation of communicated data through an access node or a core network node.

Figure 4:
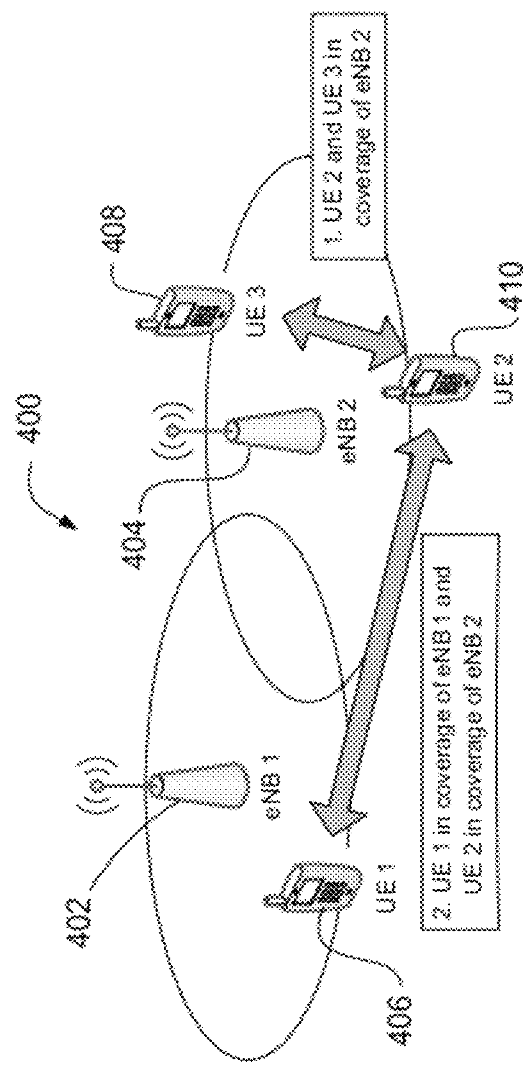
FIG. 4 illustrates mobile entities in communication via a radio access network and via direct wireless connections.

FIG. 4 shows an embodiment of a communication system 400 comprising mobile entities 406, 408, 410 in communication via eNBs 402, 404 of a radio access network (RAN) and via direct wireless connections. The depicted example illustrates peer discovery for (1) UEs 408, 410 camped at a cell on the same eNB 404 and (2) UEs 406, 410 camped at cells for respective different eNBs 402, 404. Peer discovery is a procedure whereby UEs detect the availability of other services advertised at UEs within radio frequency (RF) proximity, and may generally involve peer advertisement and peer detection.

Peer mobile entities may perform detection, wherein authorized mobile entities may receive information to be able to perform detection (e.g., security keys or the like). Also, the peer mobile entities may perform advertising, wherein authorized mobile entities may receive information to be able to advertise a discovery identifier (e.g., security keys). Each mobile entity refrains from advertising a discovery identifier for which it has not been authorized. Further, the peer mobile entities may perform direct communication, wherein each mobile entity refrains from establishing direct communication with a peer advertising a discovery identifier for which it has not been authorized.

It is noted that a network or spectrum provider may authorize a mobile entity to use the network's spectrum to perform the above described P2P communication procedures. It is also noted that the mobile entity may not be provisioned with P2P parameters and may be expected to request authorization for each procedure or set of procedures. For example, the mobile entity may request authorization for detection, detection and advertising, and/or direct communication. Authorization based on the techniques described herein could be: (a) per tracking area for tracking area update (TAU) procedures; (b) while attached for attach procedures; and/or (c) based on a lifetime of reserved bearers for evolved packet system (EPS) session management (ESM) procedures.

Figure 5:
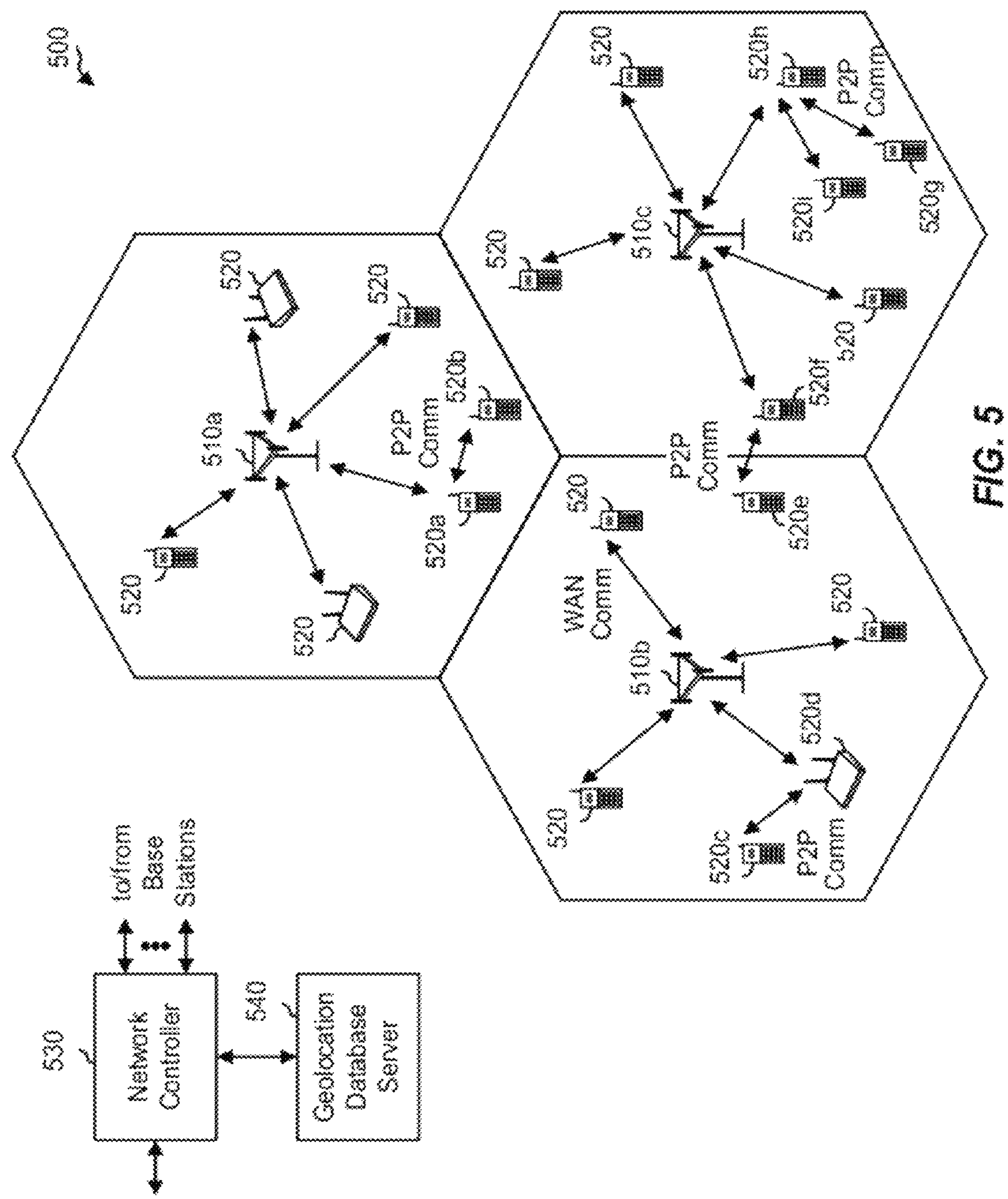
FIG. 5 shows a wireless communication network that supports both WAN communication and P2P communication.

FIG. 5 shows a wide area network (WAN) 500, which may be a LTE network or some other type of WAN. WAN 500 may include a number of base stations and other network entities. For simplicity, only three base stations 510*a*, 510*b* and 510*c* and one network controller 530 are shown in FIG. 5. A base station may be an entity that communicates with the UEs and may also be referred to as a NodeB, an eNB, an access point, etc. Each base station may provide communication coverage for a particular geographic area and may support communication for the UEs located within the coverage area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group). In the example shown in FIG. 5, WAN 500 includes macro base stations 510*a*, 510*b* and 510*c* for macro cells. WAN 500 may also include pico base stations for pico cells and/or femto/home base stations for femto cells (not shown in FIG. 5).

Network controller 530 may couple to a set of base stations and may provide coordination and control for these base stations. Network controller 530 may communicate with the base stations via a backhaul. The base stations may also communicate with one another via the backhaul. A geolocation database server 540 may couple to network controller 530 and/or other network entities. Server 540 may support use of an unlicensed spectrum, as described below.

In the description herein, a WAN communication may refer to a communication between a UE and a base station, e.g., for a call with a remote station such as another UE. An access link may refer to a communication link between a UE and a base station. A P2P communication may refer to a direct communication between two or more UEs, without going through a base station. Also, a P2P communication may refer to a third-party entity assisted communication between two or more UEs, wherein the third party entity may be a base station, another UE, etc. A P2P link may refer to a communication link between two or more UEs engaged in P2P communication. A P2P group may refer to a group of two or more UEs engaged in P2P communication. In one design, one UE in a P2P group may be designated as a P2P server, and each remaining UE in the P2P group may be designated as a P2P client. The P2P server may perform certain management functions such as exchanging signaling with a WAN, coordinating data transmission between the P2P server and the P2P client(s), etc.

In the example shown in FIG. 5, UEs 520*a* and 520*b* are under the coverage of base station 510*a* and are engaged in P2P communication. UEs 520*c* and 520*d* are under the coverage of base station 510*b* and are engaged in P2P communication. UEs 520*e* and 520*f* are under the coverage of different base stations 510*b* and 510*c* and are engaged in P2P communication. UEs 520*g*, 520*h* and 520*i* are under the coverage of the same base station 510*c* and are engaged in P2P communication. The other UEs 120 in FIG. 5 are engaged in WAN communication.

WAN 500 may operate on one or more frequency channels that are licensed to a network operator. WAN 500 may support both WAN communication and P2P communication on the licensed frequency channel(s). In this case, some resources on the licensed frequency channel(s) may be reserved for P2P communication and the remaining resources may be used for WAN communication. The term "spectrum" generally refers to a range of frequencies such as a frequency band, or a frequency channel, etc.

In accordance with one or more aspects of the embodiments described herein, there are provided techniques for network coding and its application to P2P communication. In a P2P communication system, the users of mobile entities may communicate with each other directly. In addition, or in the alternative, they can also communicate with each other through a third party entity, such as, for example, a base station (e.g., eNB) or another mobile entity. For example, a first user may send first information A to the third party, and the third party may then send the first information A to a second user. Similarly, the second user may send second information B to the third party, and the third party may then send the second information B to the first user.

In a nominal communication system, the first information A may be encoded (e.g., by using turbo codes, convolution codes, and/or other coding schemes), modulated, and transmitted. Such an encoding process is independent of the encoding process of the second information B. For example: first information A+cyclic redundancy check (CRC)→Turbo encoded→scrambling→modulation→RF transmission.

A third party (e.g., a third user) may combine the first information A and the second information B as third/coded information C, and may send the third information C to the first and second users at the same time. The first user and the second user may utilize the existing information (e.g., first information A or second information B) along with the third/coded/combined information C to decode the packet. For example, the first user may use the first information A (i.e., the information that the first user wants to send to the second user), whereas the second user may use the second information B (i.e., the information that the second user wants to send to the first user).

There are numerous approaches to combining the first information A and the second information B as the third information C. In one approach, an XOR operation or the like may be performed on information bits of the first A and/or second B information before encoding. In another approach, an XOR operation or the like may be performed on encoded bits of the first A and/or second B information before modulation. In yet another approach, a linear type operation may be performed on the first A and/or second B information to produce the third/coded information C.

In related aspects, the third-party entity should signal or provide to the first and second mobile entities information regarding how the first and second mobile entities should decode/utilize the third/coded information C, as well as on which packet(s) the third-party entity has applied this additional processing. This way the first and second mobile entities will know what additional processing to implement to recover the second information B and the first information A, respectively.

In one embodiment of a P2P communication system, two peers may use a third-party entity to transfer data or signaling between them. For example, the first and second users or mobile entities may be are nominal LTE UEs. The third user or third-party entity may be an eNB or other network entity. The first and second users may communicate with the third-party entity to exchange data/information. For example, the eNB may use a downlink control signal (e.g., physical downlink control channel (PDCCH)) or layer 3 signaling to carry additional information when it sends a packet which has been performed by one or more of following processing: (a) XOR of information bits targeted for the first and second users before encoding (when the number of information bits are the same for first and second users, the XOR operation may be performed on each bit; when the number differs, the XOR operation or the like may be performed on a subset of the bits); (b) XOR operation on of encoding bits for the first and second users before modulation; or (c) other processing such that the resulting packet is a function of information bits for the first and second users.

In related aspects, the resulting third/coded information C may include a key for extracting the first information A and/or the second information B from the third/coded information C. For layer 3 signaling (radio resource control (RRC) signaling or broadcast), the first and second users may use a key relating to known system information to determine which packet(s) were subject to the above-described processing/coding by the eNB. For example, the key may comprise a header of the third information C.

For layer 1 signaling by the PDCCH, a PDCCH payload portion, a CRC mask, and/or given/defined bit pattern in the PDCCH may include or indicate whether the PDSCH with respect to the PDCCH grant has been subject to the above-described processing/coding by the eNB. The key may also include information about the size of the first A and second B information, such as, for example, when the respective sizes of the information may differ. For example, the size of information A and/or B may comprise transport block size (TBS) in LTE.

From a UE perspective, once the UE receives signaling that PDSCH has been performed by one or more of the above-described processing/coding, the UE may utilize the information it transmitted earlier and the current received PDSCH to recover the information that the other UE intends to send to it via the eNB. For example, a first mobile entity of the first user may utilize (a) the first information A it sent earlier and (b) the current received PDSCH or third/coded information C to recover the second information B sent by the second mobile entity via the eNB.

In further related aspects, signaling may also be performed through a medium access control (MAC) protocol data unit (PDU) control unit in PDSCH. A transmitter may also signal which uplink MAC PDU should be used to decode the current downlink MAC PDU. The signaling may be embedded in a payload of the downlink MAC PDU header or the like. The above-described processing/coding does not apply to the MAC PDU header. The transmitter may pair users such that the TBSs from those users are matched when performing the processing/coding (e.g., XOR operation, etc.). In the alternative, if the TBSs are different, the shorter transport block may be padded to match the respective TBSs of both the first information A and the second information B.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
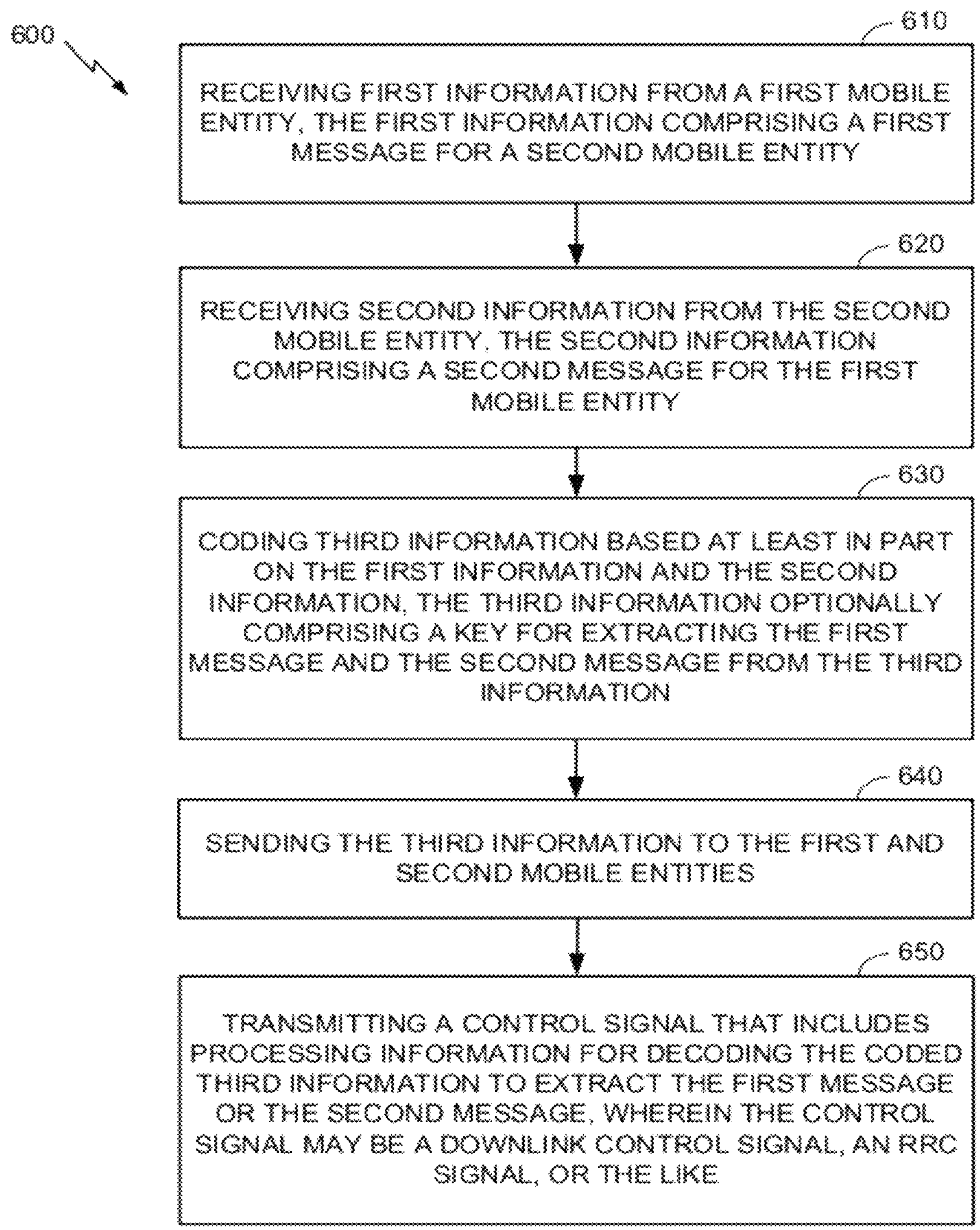
FIG. 6 shows a methodology for third-party assisted P2P communication by a third-party entity.

In accordance with one or more aspects of the subject of this disclosure, there are provided methods for third-party assisted P2P communication. With reference to FIG. 6, illustrated is a methodology 600 that may be performed at a third-party entity, such as a network entity (e.g., a base station) or a mobile entity (e.g., a UE). The method 600 may involve, at 610, receiving first information from a first mobile entity, the first information comprising a first message for a second mobile entity. The method 600 may involve, at 620, receiving second information from the second mobile entity, the second information comprising a second message for the first mobile entity. The method 600 may involve, at 630, coding third information based at least in part on the first information and the second information. The method 600 may involve, at 640, sending the third information to the first and second mobile entities. The method 600 may involve, at 650, transmitting a control signal that includes processing information for decoding the coded third information to extract the first message or the second message. In related aspects, the control signal may be a downlink control signal, a radio resource control (RRC) signal, or the like.

Figure 7:
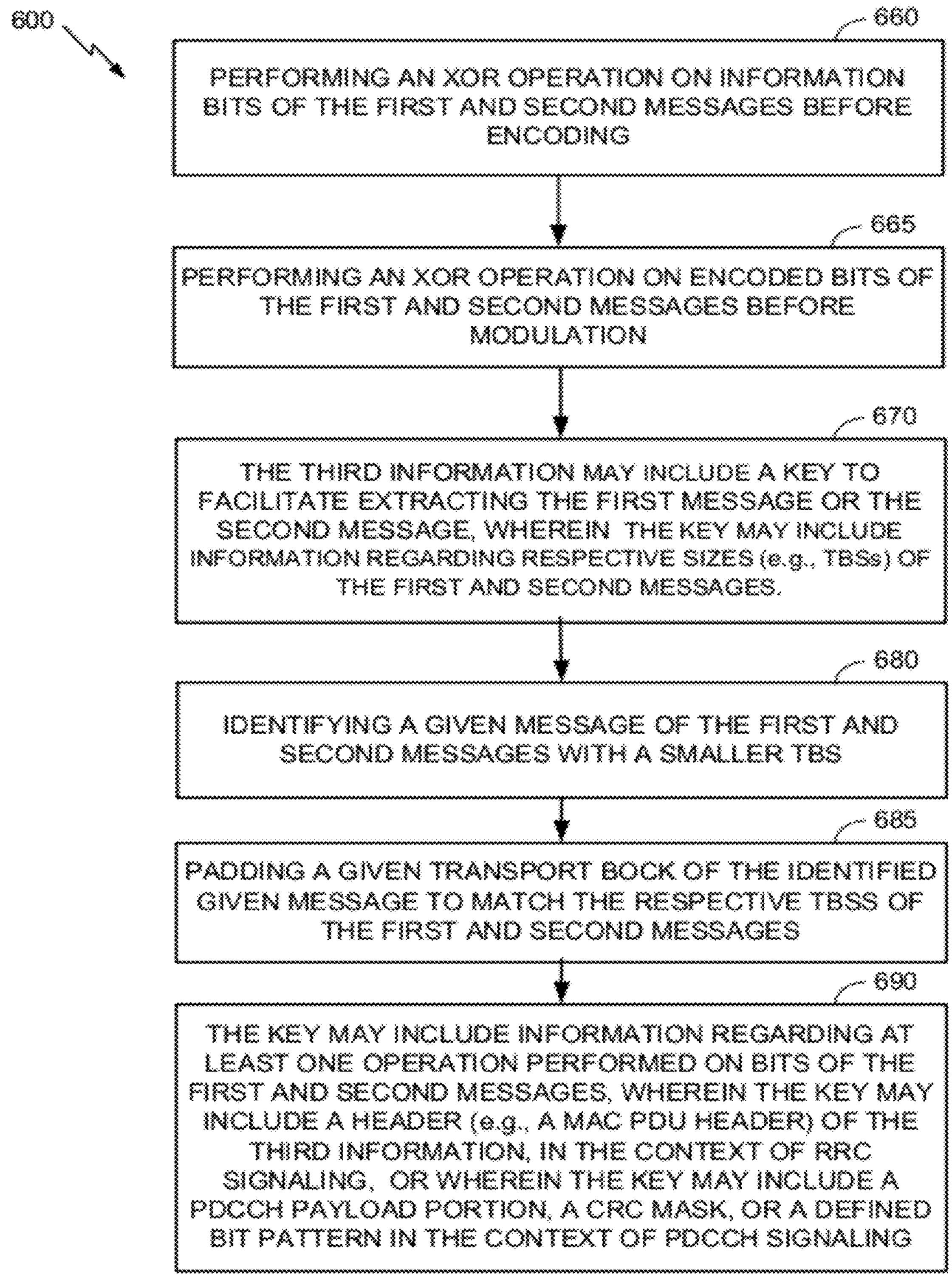
FIG. 7 shows further aspects of the methodology of FIG. 6.

With reference to FIG. 7, coding may involve, at 660, performing an XOR operation or the like on information bits of the first and second messages before encoding. In the alternative, coding may involve, at 665, performing an XOR operation or the like on encoded bits of the first and second messages before modulation.

In related aspects, the third information may include a key to facilitate extracting the first message or the second message (block 670). The key may include information regarding respective sizes of the first and second messages. The respective sizes may be the respective TBSs of the first and second messages. In response to determining the respective TBSs of the first and second messages are different, the method 600 may involve, at 680, identifying a given message of the first and second messages with a smaller TBS, and, at 685, padding a given transport bock of the identified given message to match the respective TBSs of the first and second messages.

In further aspects, the key may include information regarding at least one operation performed on bits of the first and second messages (block 690). For example, the key may include a header of the third information, in the context of RRC signaling. The header may be a MAC PDU header. In another example, the key may include one of a PDCCH payload portion, a CRC mask, and a defined bit pattern, in the context of PDCCH signaling.

Figure 8A:
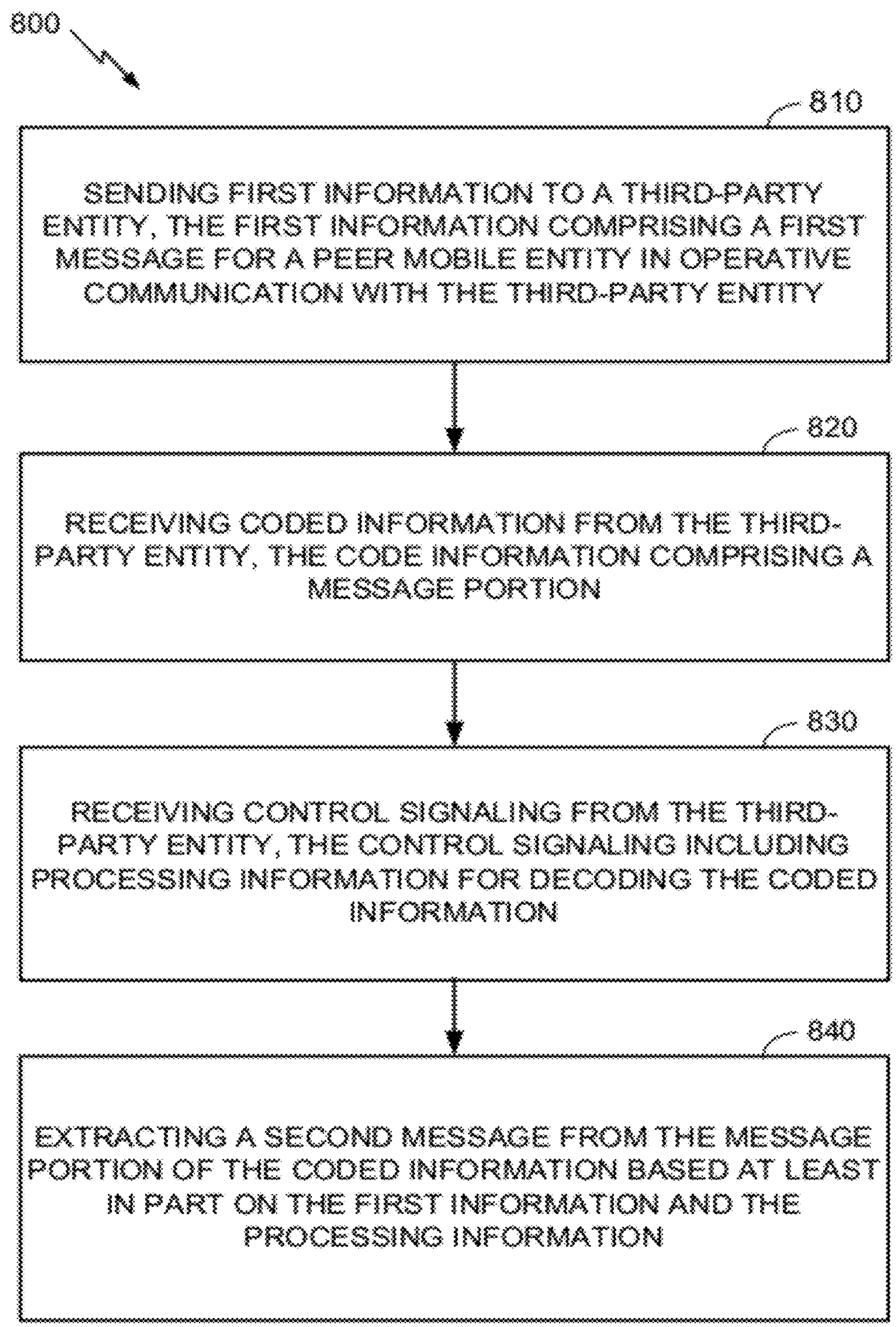
FIG. 8A shows a methodology for third-party assisted P2P communication by a mobile entity.

In accordance with one or more aspects of the subject of this disclosure, FIG. 8A illustrates a methodology 800 for third-party assisted P2P communication that may be performed by a mobile entity (e.g., a UE). The method 800 may involve, at 810, sending first information to a third-party entity (e.g., a network entity or another mobile entity), the first information comprising a first message for a peer mobile entity in operative communication with the third-party entity. The method 800 may involve, at 820, receiving coded information from the third-party entity, the code information comprising a message portion. The method 800 may involve, at 830, receiving control signaling from the third-party entity, the control signaling including processing information for decoding the coded information. The method 800 may involve, at 840, extracting a second message from the message portion of the coded information based at least in part on the first information and the processing information.

Figure 8B:
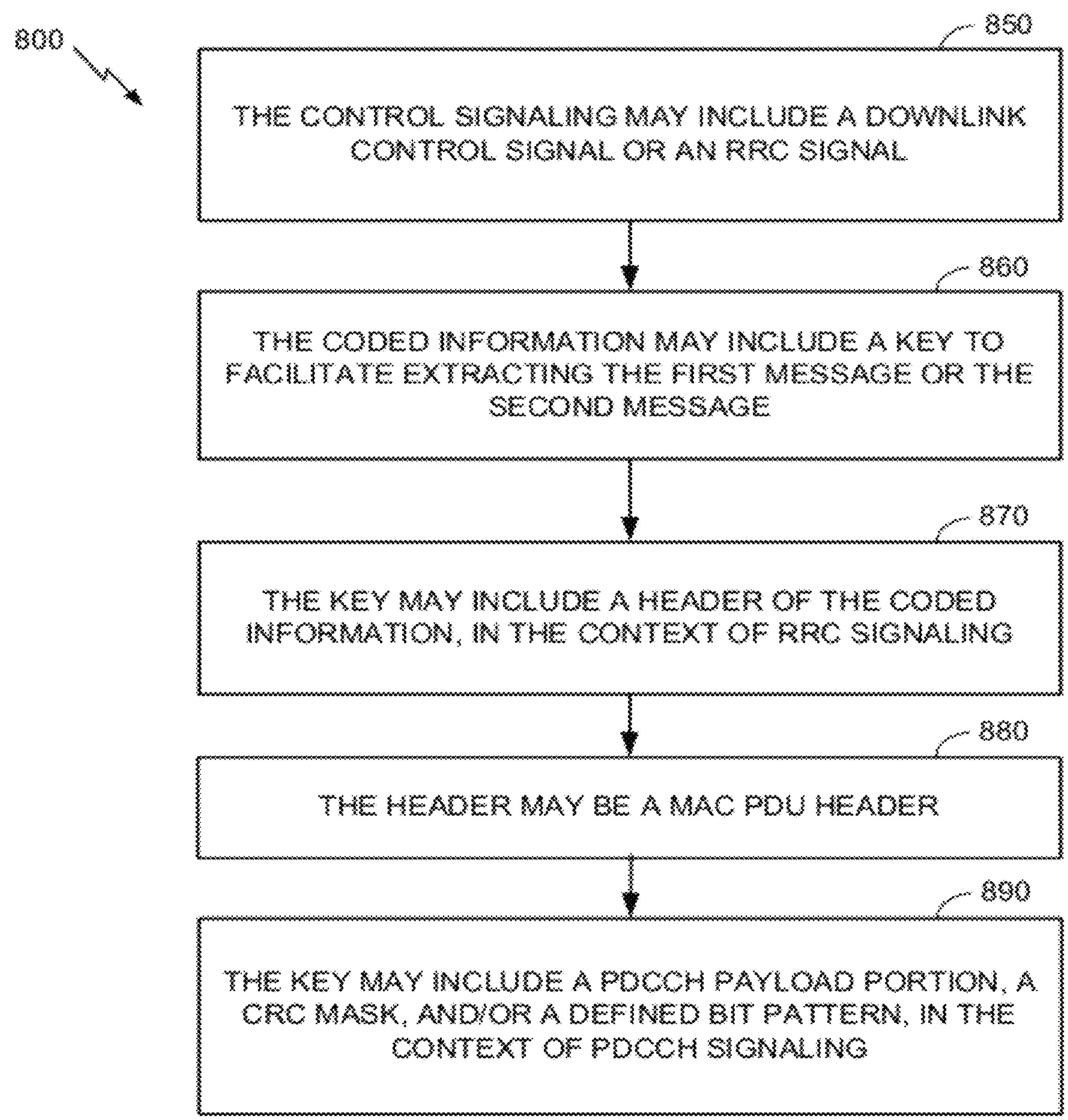
FIG. 8B shows further aspects of the methodology of FIG. 8A.

With reference to FIG. 8B, the control signaling may include a downlink control signal or an RRC signal (block 850). The coded information may include a key to facilitate extracting the first message or the second message (block 860). The key may include a header of the coded information, in the context of RRC signaling (block 870). For example, the header may be a MAC PDU header (block 880). The key may include a PDCCH payload portion, a CRC mask, and/or a defined bit pattern, in the context of PDCCH signaling (block 890).

Figure 9:
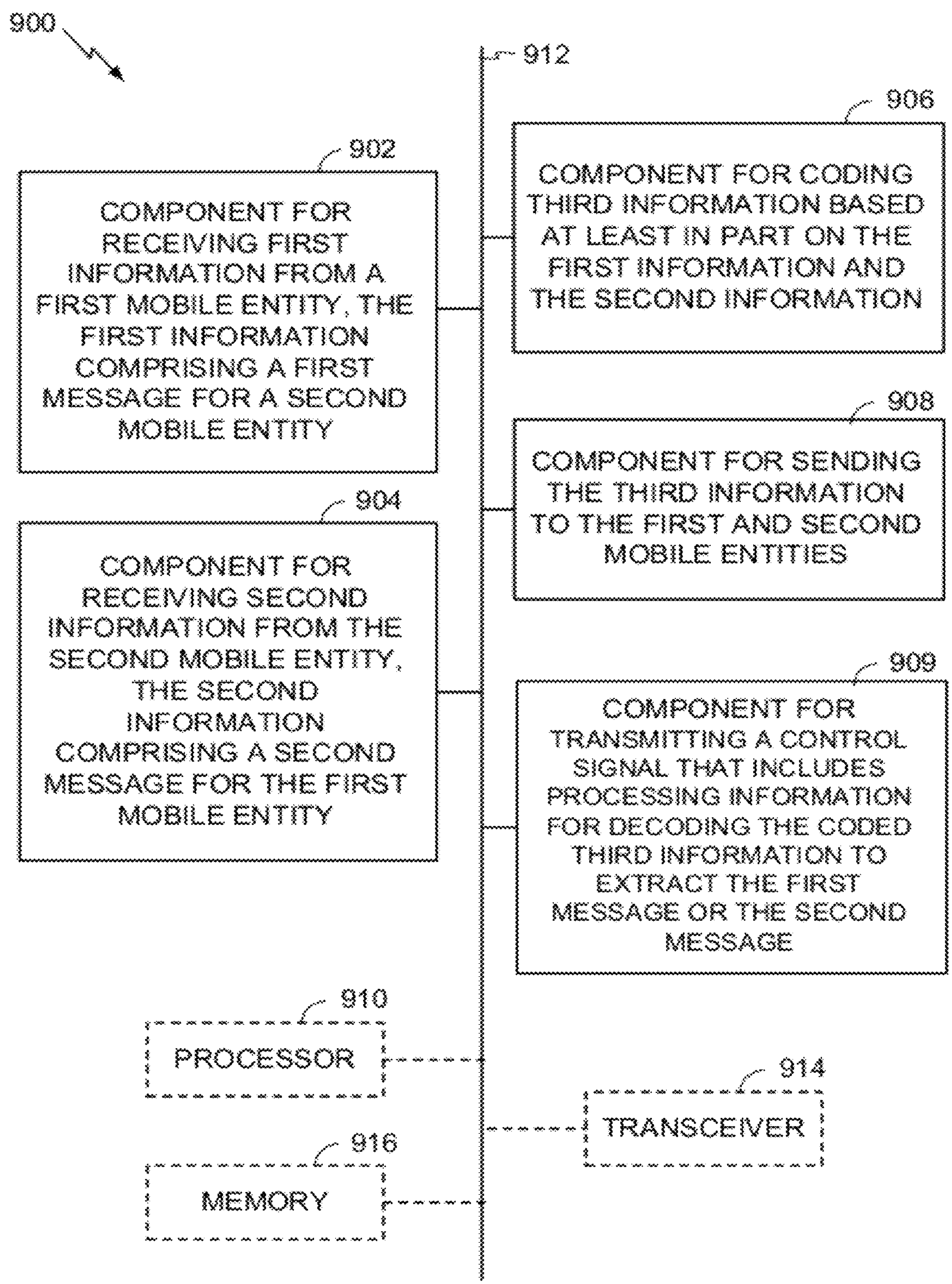
FIG. 9 shows an apparatus for third-party assisted P2P communication, in accordance with the methodology of FIGS. 6-7.

In accordance with one or more aspects of the embodiments described herein, there are provided devices and apparatuses for third-party assisted P2P communications, as described above with reference to FIGS. 6-7. With reference to FIG. 9, there is provided an exemplary mobile apparatus 900 that may be configured as a third-party entity, such as a network entity (e.g., an eNB) or another mobile entity (e.g., a UE) in a wireless network, or as a processor or similar device for use within the network or mobile entity. The apparatus 900 may include functional blocks that can represent functions implemented by a processor, software, or combination thereof (e.g., firmware).

For example, the apparatus 900 of FIG. 9 may comprise an electrical component or module 902 for receiving first information from a first mobile entity, the first information comprising a first message for a second mobile entity. For example, the electrical component 902 may include at least one receiver coupled to a processor and/or a memory. The electrical component 902 may be, or may include, a means for receiving first information from a first mobile entity, the first information comprising a first message for a second mobile entity. Said means may be or may include the at least one receiver (e.g., the receiver(s) 222*a-t*, the demodulator 240, and/or RX data processor 242 of FIG. 2, or the transceiver 914 of FIG. 9).

The apparatus 900 may comprise an electrical component 904 for receiving second information from the second mobile entity, the second information comprising a second message for the first mobile entity. For example, the electrical component 904 may include at least one receiver coupled to a processor and/or a memory. The electrical component 904 may be, or may include, a means for receiving second information from the second mobile entity, the second information comprising a second message for the first mobile entity. Said means may be or may include the at least one receiver (e.g., the receiver(s) 222*a-t*, the demodulator 240, and/or RX data processor 242 of FIG. 2, or the transceiver 914 of FIG. 9).

The apparatus 900 may comprise an electrical component 906 for coding third information based at least in part on the first information and the second information. For example, the electrical component 906 may include at least one processor coupled to a receiver, transmitter, and/or a memory. The electrical component 906 may be, or may include, a means for coding third information based at least in part on the first information and the second information. Said means may be or may include the at least one control processor (e.g., the processor 230 of FIG. 2, or processor 910 of FIG. 9).

The apparatus 900 may comprise an electrical component 908 for sending the third information to the first and second mobile entities. For example, the electrical component 908 may include at least one transmitter coupled to a processor and/or a memory. The electrical component 908 may be, or may include, a means for sending the third information to the first and second mobile entities. Said means may be or may include the at least one transmitter (e.g., the transmitter(s) 222*a-t*, the TX MIMO processor 220, and/or TX data processor 214 of FIG. 2, or the transceiver 914 of FIG. 9).

The apparatus 900 may comprise an electrical component 909 for transmitting a control signal that includes processing information for decoding the coded third information to extract the first message or the second message. For example, the electrical component 909 may include at least one transmitter coupled to a processor and/or a memory. The electrical component 908 may be, or may include, a means for sending the third information to the first and second mobile entities. Said means may be or may include the at least one transmitter (e.g., the transmitter(s) 222*a-t*, the TX MIMO processor 220, and/or TX data processor 214 of FIG. 2, or the transceiver 914 of FIG. 9).

In related aspects, the apparatus 900 may optionally include a processor component 910 having at least one processor, in the case of the apparatus 900 configured as a network entity, rather than as a processor. The processor 910, in such case, may be in operative communication with the components 902-909 via a bus 912 or similar communication coupling. The processor 910 may effect initiation and scheduling of the processes or functions performed by electrical components 902-909.

In further related aspects, the apparatus 900 may include a radio transceiver component 914. A stand alone receiver and/or stand alone transmitter may be used in lieu of or in conjunction with the transceiver 914. The apparatus 900 may optionally include a component for storing information, such as, for example, a memory device/component 916. The computer readable medium or the memory component 916 may be operatively coupled to the other components of the apparatus 900 via the bus 912 or the like. The memory component 916 may be adapted to store computer readable instructions and data for effecting the processes and behavior of the components 902-909, and subcomponents thereof, or the processor 910, or the methods disclosed herein. The memory component 916 may retain instructions for executing functions associated with the components 902-909. While shown as being external to the memory 916, it is to be understood that the components 902-909 can exist within the memory 916.

Figure 10:
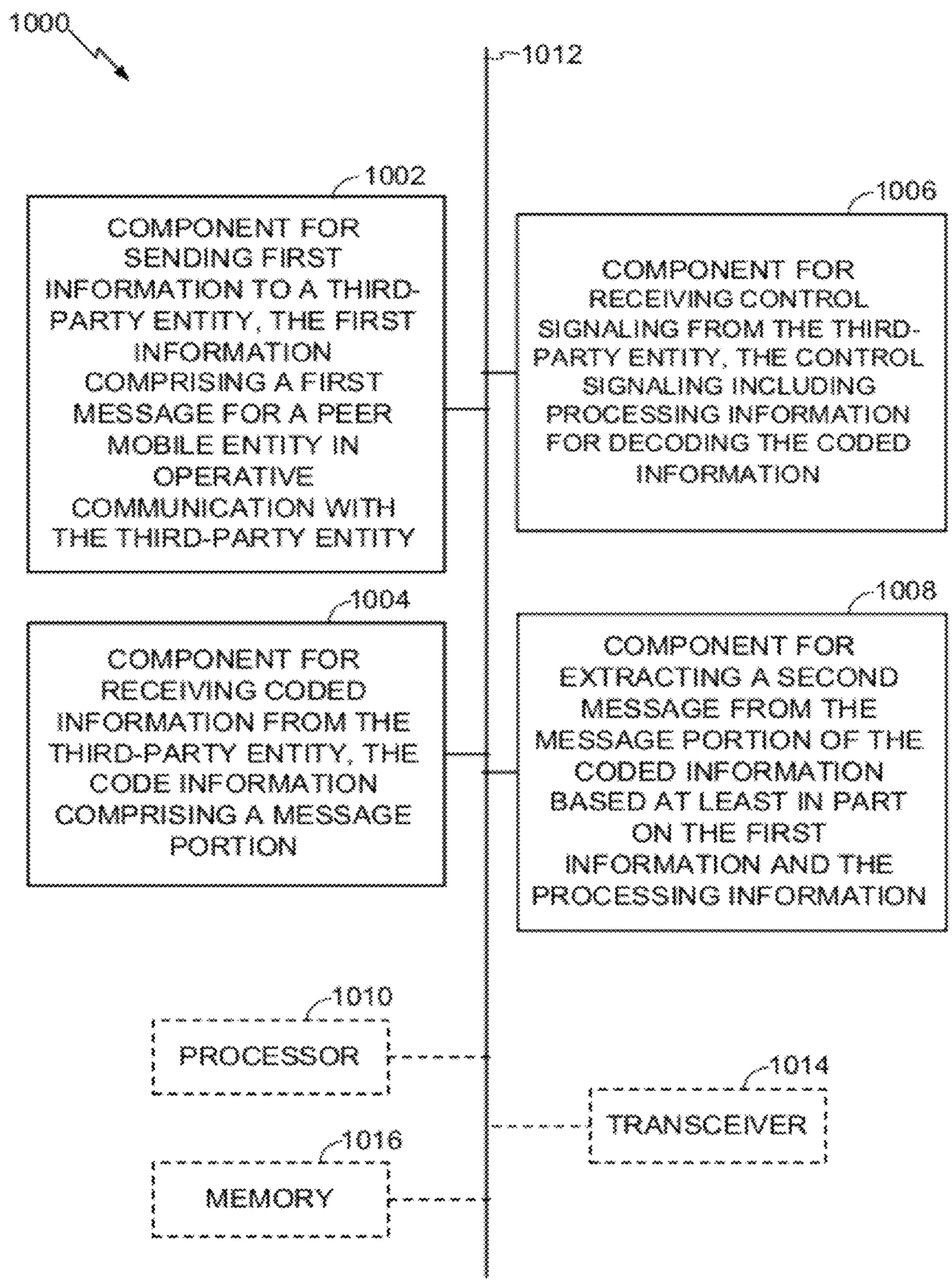
FIG. 10 shows an apparatus for third-party assisted P2P communication, in accordance with the methodology of FIGS. 8A-B.

In accordance with one or more aspects of the embodiments described herein, there are provided devices and apparatuses (e.g., mobile entities) for third-party assisted P2P communication, as described above with reference to FIGS. 8A-B. With reference to FIG. 10, the apparatus 1000 may comprise an electrical component or module 1002 for sending first information to a third-party entity, the first information comprising a first message for a peer mobile entity in operative communication with the third-party entity. For example, the electrical component 1002 may include at least one transmitter coupled to a processor and/or a memory. The electrical component 1002 may be, or may include, a means for sending first information to a third-party entity, the first information comprising a first message for a peer mobile entity in operative communication with the third-party entity. Said means may be or may include the at least one transmitter (e.g., the transmitter(s) 254*a-r*, the modulator 280, and/or the TX data processor 238 of FIG. 2, or the transceiver 1014 of FIG. 10).

The apparatus 1000 may comprise an electrical component 1004 for receiving coded information from the third-party entity, the code information comprising a message portion. For example, the electrical component 1004 may include at least one receiver coupled to a processor and/or a memory. The electrical component 1004 may be, or may include, a means for receiving coded information from the third-party entity, the code information comprising a message portion. Said means may be or may include the at least one receiver (e.g., the receivers(s) 254*a-r* and/or the RX data processor 260 of FIG. 2, or the transceiver 1014 of FIG. 10).

The apparatus 1000 may comprise an electrical component 1006 for receiving control signaling from the third-party entity, the control signaling including processing information for decoding the coded information. For example, the electrical component 1006 may include at least one receiver coupled to a processor and/or a memory. The electrical component 1006 may be, or may include, a means for receiving control signaling from the third-party entity, the control signaling including processing information for decoding the coded information. Said means may be or may include the at least one receiver (e.g., the receivers(s) 254*a-r* and/or the RX data processor 260 of FIG. 2, or the transceiver 1014 of FIG. 10).

The apparatus 1000 may comprise an electrical component 1008 for extracting a second message from the message portion of the coded information based at least in part on the first information and the processing information. For example, the electrical component 1008 may include at least one processor coupled to a receiver, transmitter, and/or a memory. The electrical component 1008 may be, or may include, a means for extracting a second message from the message portion of the coded information based at least in part on the first information and the processing information. Said means may be or may include the at least one control processor (e.g., the processor 270 of FIG. 2, or processor 1010 of FIG. 10).

For the sake of conciseness, the rest of the details regarding apparatus 1000 are not further elaborated on; however, it is to be understood that the remaining features and aspects of the apparatus 1000 are substantially similar to those described above with respect to apparatus 900 of FIG. 9.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for third-party assisted peer-to-peer (P2P) communication by a third-party entity, comprising:

receiving first information from a first mobile entity, the first information comprising a first message for a second mobile entity;

receiving second information from the second mobile entity, the second information comprising a second message for the first mobile entity;

coding third information based at least in part on a subset of information bits of the first information and the second information, the third information comprising a key regarding at least one operation performed on bits of the first or second message, wherein the key comprises information regarding respective sizes of the first and second messages, the respective sizes comprising respective transport block sizes (TBSs) of the first and second messages, further comprising, in response to determining the respective TBSs of the first and second messages are different:

identifying a given message of the first and second messages with a smaller TBS; and defining the subset of information bits according to the size of the identified given message to match the respective TBSs of the first and second messages;

sending the third information to the first and second mobile entities; and transmitting a control signal that includes processing information for decoding the coded third information to extract the first message or the second message.

2. The method of claim 1, wherein coding the third information comprises performing an XOR operation on the subset of information bits of the first and second messages before encoding.

3. The method of claim 1, wherein coding the third information comprises performing an XOR operation on encoded bits of the first and second messages before modulation.

4. The method of claim 1, wherein the control signal comprises a downlink control signal or a radio resource control (RRC) signal.

5. The method of claim 1, wherein the third information comprises the key to facilitate extracting the first message or the second message.

6. The method of claim 5, wherein the key comprises a header of the third information, in the context of radio resource control (RRC) signaling.

7. The method of claim 6, wherein the header comprises a medium access control (MAC) protocol data unit (PDU) header.

8. The method of claim 5, wherein the key comprises one of a physical downlink control channel (PDCCH) payload portion, a cyclic redundancy check (CRC) mask, and a defined bit pattern, in the context of PDCCH signaling.

9. The method of claim 1, wherein the third-party entity comprises a network entity or a third mobile entity.

10. The method of claim 9, wherein the network entity comprises an eNB.

11. An apparatus for third-party assisted peer-to-peer (P2P) communication by a third-party entity, comprising:

at least one processor configured to: receive first information from a first mobile entity, the first information comprising a first message for a second mobile entity; receive second information from the second mobile entity, the second information comprising a second message for the first mobile entity; code third information based at least in part on a subset of information bits of the first information and the second information, the third information comprising a key regarding at least one operation performed on bits of the first or second message, wherein the key comprises information regarding respective sizes of the first and second messages, the respective sizes comprising respective transport block sizes (TBSs) of the first and second messages, further comprising, in response to determining the respective TBSs of the first and second messages are different:

identifying a given message of the first and second messages with a smaller TBS; and defining the subset of information bits according to the size of the identified given message to match the respective TBSs of the first and second messages;

send the third information to the first and second mobile entities; and transmit a control signal that includes processing information for decoding the coded third information to extract the first message or the second message; and a memory coupled to the at least one processor for storing data.

12. An apparatus, comprising:

means for receiving first information from a first mobile entity, the first information comprising a first message for a second mobile entity;

means for receiving second information from the second mobile entity, the second information comprising a second message for the first mobile entity;

means for coding third information based at least in part on a subset of information bits of the first information and the second information, the third information comprising a key regarding at least one operation performed on bits of the first or second message, wherein the key comprises information regarding respective sizes of the first and second messages, the respective sizes comprising respective transport block sizes (TBSs) of the first and second messages, further comprising, in response to determining the respective TBSs of the first and second messages are different:

identifying a given message of the first and second messages with a smaller TBS; and defining the subset of information bits according to the size of the identified given message to match the respective TBSs of the first and second messages;

means for sending the third information to the first and second mobile entities; and means for transmitting a control signal that includes processing information for decoding the coded third information to extract the first message or the second message.

13. The apparatus of claim 12, wherein the control signal comprises a downlink control signal or a radio resource control (RRC) signal.

14. The apparatus of claim 12, wherein the third information comprises the key to facilitate extracting the first message or the second message.

15. A computer program product, comprising:

a non-transitory computer-readable medium comprising code for causing a computer to:

receive first information from a first mobile entity, the first information comprising a first message for a second mobile entity;

receive second information from the second mobile entity, the second information comprising a second message for the first mobile entity;

code third information based at least in part on a subset of information bits of the first information and the second information, the third information comprising a key regarding at least one operation performed on bits of the first or second message, wherein the key comprises information regarding respective sizes of the first and second messages, the respective sizes comprising respective transport block sizes (TBSs) of the first and second messages, further comprising, in response to determining the respective TBSs of the first and second messages are different:

identifying a given message of the first and second messages with a smaller TBS; and defining the subset of information bits according to the size of the identified given message to match the respective TBSs of the first and second messages;

send the third information to the first and second mobile entities; and transmit a control signal that includes processing information for decoding the coded third information to extract the first message or the second message.

16. A method for third-party assisted peer-to-peer (P2P) communication by a mobile entity, comprising:

sending first information to a third-party entity, the first information comprising a first message for a peer mobile entity in operative communication with the third-party entity;

receiving coded information from the third-party entity, the code information comprising a message portion coded from a subset of information bits of the first information and a second information from another mobile entity, and a key regarding at least one operation performed on bits of the first message or a second message from the other mobile entity; wherein the key comprises information regarding respective sizes of the first and second messages, the respective sizes comprising respective transport block sizes (TBSs) of the first and second messages, further comprising, in response to determining the respective TBSs of the first and second messages are different:

identifying a given message of the first and second messages with a smaller TBS; and defining the subset of information bits according to the size of the identified given message to match the respective TBSs of the first and second messages;

receiving control signaling from the third-party entity, the control signaling including processing information for decoding the coded information; and extracting the second message from the message portion of the coded information based at least in part on the key and the processing information.

17. The method of claim 16, wherein the control signaling comprises a downlink control signal or a radio resource control (RRC) signal.

18. The method of claim 16, wherein the coded information comprises the key to facilitate extracting the first message or the second message.

19. The method of claim 18, wherein the key comprises a header of the coded information, in the context of radio resource control (RRC) signaling.

20. The method of claim 19, wherein the header comprises a medium access control (MAC) protocol data unit (PDU) header.

21. The method of claim 18, wherein the key comprises one of a physical downlink control channel (PDCCH) payload portion, a cyclic redundancy check (CRC) mask, and a defined bit pattern, in the context of PDCCH signaling.

22. An apparatus for third-party assisted peer-to-peer (P2P) communication by a mobile entity, comprising:

at least one processor configured to: send first information to a third-party entity, the first information comprising a first message for a peer mobile entity in operative communication with the third-party entity; receive coded information from the third-party entity, the code information comprising a message portion coded from a subset of information bits of the first information and a second information from another mobile entity, and a key regarding at least one operation performed on bits of the first message or a second message from the other mobile entity; wherein the key comprises information regarding respective sizes of the first and second messages, the respective sizes comprising respective transport block sizes (TBSs) of the first and second messages, further comprising, in response to determining the respective TBSs of the first and second messages are different:

identifying a given message of the first and second messages with a smaller TBS; and defining the subset of information bits according to the size of the identified given message to match the respective TBSs of the first and second messages;

receive control signaling from the third-party entity, the control signaling including processing information for decoding the coded information; and extract the second message from the message portion of the coded information based at least in part on the key and the processing information; and a memory coupled to the at least one processor for storing data.

23. An apparatus, comprising:

means for sending first information to a third-party entity, the first information comprising a first message for a peer mobile entity in operative communication with the third-party entity;

means for receiving coded information from the third-party entity, the code information comprising a message portion coded from a subset of information bits of the first information and a second information from another mobile entity and a key regarding at least one operation performed on bits of the first message or a second message from the other mobile entity; wherein the key comprises information regarding respective sizes of the first and second messages, the respective sizes comprising respective transport block sizes (TBSs) of the first and second messages, further comprising, in response to determining the respective TBSs of the first and second messages are different:

identifying a given message of the first and second messages with a smaller TBS; and defining the subset of information bits according to the size of the identified given message to match the respective TBSs of the first and second messages;

means for receiving control signaling from the third-party entity, the control signaling including processing information for decoding the coded information; and means for extracting the second message from the message portion of the coded information based at least in part on the key and the processing information.

24. The apparatus of claim 23, wherein the control signaling comprises a downlink control signal or a radio resource control (RRC) signal.

25. The apparatus of claim 23, wherein the coded information comprises the key to facilitate extracting the first message or the second message.

26. A computer program product, comprising:

a non-transitory computer-readable medium comprising code for causing a computer to:

send first information to a third-party entity, the first information comprising a first message for a peer mobile entity in operative communication with the third-party entity;

receive coded information from the third-party entity, the code information comprising a message portion coded from a subset of information bits of the first information and a second information from another mobile entity, and a key regarding at least one operation performed on bits of the first message or a second message from the other mobile entity; wherein the key comprises information regarding respective sizes of the first and second messages, the respective sizes comprising respective transport block sizes (TBSs) of the first and second messages, further comprising, in response to determining the respective TBSs of the first and second messages are different:

identifying a given message of the first and second messages with a smaller TBS; and defining the subset of information bits according to the size of the identified given message to match the respective TBSs of the first and second messages;

receive control signaling from the third-party entity, the control signaling including processing information for decoding the coded information; and extract the second message from the message portion of the coded information based at least in part on the key and the processing information.

* * * * *